M. L. GORHAM.
Harvester.

No. 160,895. 3 Sheets--Sheet 1.

Patented March 16, 1875.

M. L. GORHAM.
Harvester.

No. 160,895.

3 Sheets--Sheet 3.

Patented March 16, 1875.

Attest:
J. Mason Goszler
William T. Andrews

Inventor:
Marquis L. Gorham
By N. Cranford atty.

THE GRAPHIC CO.PHOTO-LITH. 39 & 41 PARK PLACE, N.Y.

UNITED STATES PATENT OFFICE.

MARQUIS L. GORHAM, OF ROCKFORD, ILLINOIS.

IMPROVEMENT IN HARVESTERS.

Specification forming part of Letters Patent No. 160,895, dated March 16, 1875; application filed November 4, 1874.

*To all whom it may concern:*

Be it known that I, MARQUIS L. GORHAM, of Rockford, in the county of Winnebago, in the State of Illinois, have made certain improvements in the means of carrying unbound grain from a harvester to a grain-binder, of which the following is the specification:

The object of this invention is to carry the grain as it is cut by the harvester and deliver it in a continuous flow, the straw in a straight condition, and in the right direction to be centrally in the right line to the binding device, whether the machine is traveling on level or uneven ground; and it consists in the construction and arrangement of the parts that produce the results.

Figure 1:
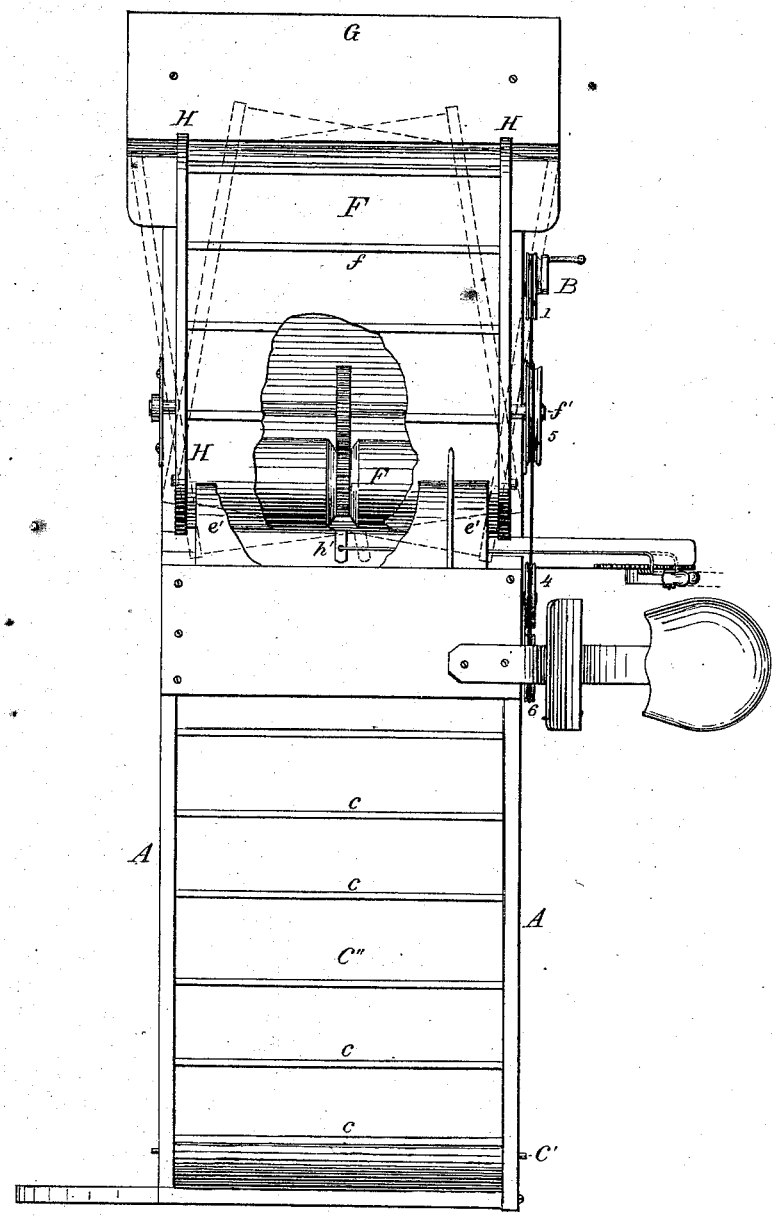
Figure 2:
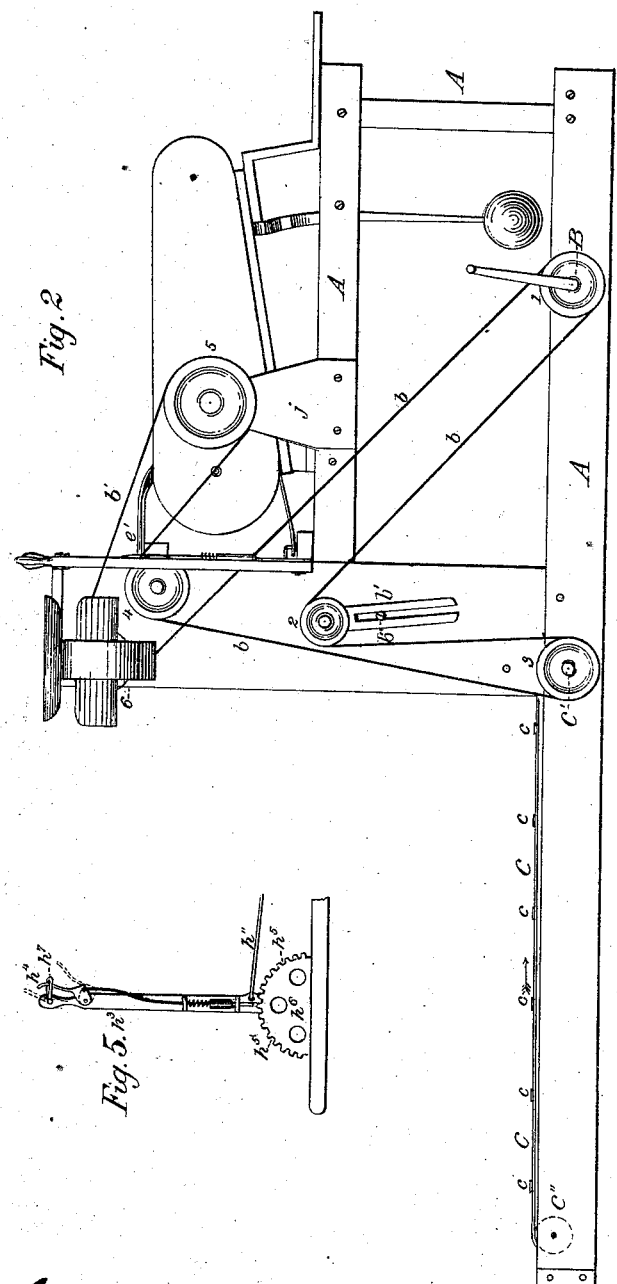
Figure 3:
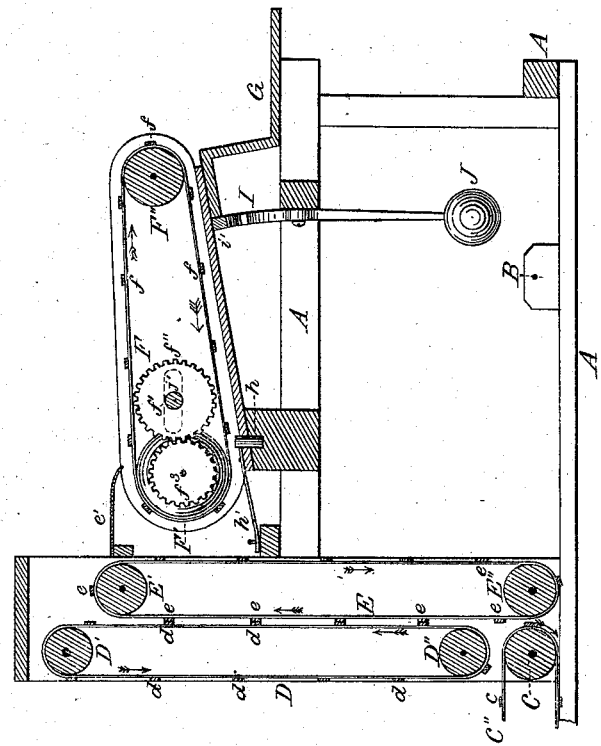
Figure 4:
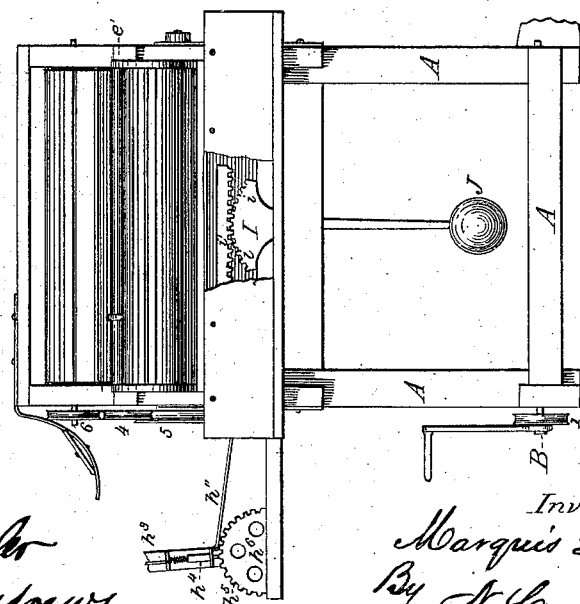

In the drawings, Figure 1, a top view of the device; Fig. 2, a side view; Fig. 3, part longitudinal sectional view; Fig. 4, transverse view, partly broken; and Fig. 5, detail of parts.

A represents the framing that supports the operating parts, and is either a part of or is attached to the frame of the harvester. B is the transverse driving-shaft, working in proper bearings on the sills of frame A, and gets its motion from the power that operates the harvester in any convenient and proper manner, and from which shaft motion is communicated to all the operating parts of the device. $b$ is a driving-belt, going from around pulley 1 on shaft B, around the train of pulleys 2, 3, 4, 5, and 6, which pulleys give direction to the belt, and operate or put in motion other parts of the device, as will be explained. Pulley 2 is for giving direction to and straining the driving-belt $b$, and works in bearings in the adjusting and slotted arm $b'$, that is held in place by holding screw $b''$, when the pulley 2 is in proper position to keep the belt $b$ in proper strain or direction. C is a horizontal endless carrying-belt, having transverse strips $c$ at intervals thereon, and is the platform upon which the grain falls as it is cut by the harvester, and goes around shafts C' and C'', and is put in motion by belt $b$, going around pulley 3 on shaft C', and causes the carrying-belt to go in the direction of the arrow. D is an upright endless carrying-belt, having transverse strips $d$, and goes around shafts D' and D'', getting its motion from pulley 6 on shaft D', and travels in the direction shown by the arrows. E is another parallel upright endless carrying-belt, with transverse strips $e$, and it goes around two shafts, E' and E'', in the directions of arrows, and is given motion by belt $b$ around pulley 4 on shaft E'. Carrying-belt E drops lower at its bottom end than belt D, to stop the flow of unbound grain on belt C, and is lower at its top end than belt D, to allow the flow of grain in the straw to be carried over it and fall upon a chute, $e'$, to be delivered thence upon another carrier. As the heads of the unbound grain feed forward faster than the butts, chute $e'$ is made longer on the side where the heads travel to allow the butts to first fall upon the carrier, and thus have the grain placed on the carrier in the right direction. F is a nearly horizontal and transversely-vibrating endless carrier to deliver the flow of grain into the receiver G of a binding device, where it is fed to the binder. $f\ f$ are strips transversely attached to the belt F, which moves in the direction of the arrows to deliver the grain into the receiver. F' and F'' are two revolving shafts, around which the endless delivery-belt goes, while the belt is put in motion by means of the pulley 5 on shaft $f'$, toothed wheel $f''$, that gears into wheel $f^3$ on shaft F'. The delivery endless belt F, with its shafts F' and F'', is fixed in a frame, H, that is pivoted on its under side at $h$ to frame A, so that the frame and endless belt can be vibrated upon the pivot, so as to change laterally the position of the delivery end of the frame, the object being to keep the center of the flow of the unbound grain in line with the binding device when the grain falls into the receiver, and in order to do this an arm, $h'$, is attached to the under side of frame H and at the end next the elevators D and E, to which is attached a connecting-rod, $h''$, that is attached to a vibrating hand-lever, $h^3$, which is pivoted at its bottom end to a convenient part of frame A, and has a hand spring-catch, $h^4$, attached, that catches into indents $h^5$ on circular plate $h^6$, and by moving the lever $h^3$ the frame will be vibrated, and when vibrated can be held by the spring-catch taking into indent in the plate $h^6$. If at any time it is not necessary to have the catch hold the frame from vibrating, a link, $h^7$, can be slid upon the hand-lever of the spring-catch, and hold the catch from entering the indents, as seen in Fig. 5. I is a pivoted pendent and weighted arm, and has segmental toothed gear $i$ at its upper end, that gears into rack gear $i'$, that is fast to the under side of frame H, as seen in Fig. 4. J is an adjustable weight on the lower end of arm I. This attachment of segmental gear on pendent and weighted arm in connection with the rack-gear on the vibrating frame is to overcome the tendency of the cut grain, when the machine is working over uneven ground, from going out of the line of direction to the binder, as it would if not counteracted. As the weighted arm by its gravity keeps the arm in a vertical position, the delivery end of the carrier-frame will be carried over to the highest side of the machine in proportion as the machine is laterally inclined, and thus keep the grain in the right direction centrally. Shaft $f'$ is journaled in fixed bearings $j$ on frame A, and in order to allow of the vibration of the frame H slots $j'$ are made in the sides of said frame horizontally, as seen in dotted lines in Fig. 3.

There being a difference in the delivery of long or short straw of the grain into the receiver G, to have the center of the length of the grain in line with the binder the frame H can be raised up, so that the rack $i'$ will be out of gear with the segmental gear, when the frame H can be vibrated in the proper direction to accommodate the length of straw, and then let down so that the gear will match, when the grain will all be delivered without further change while the machine is working on tolerable level ground, and if uneven then the weighted arm automatically operates, as above described.

This improvement can be attached as an intermediate device between a harvester and a grain-binder.

Having thus described my invention, what I claim is—

1. The pivoted vibrating frame H, having carrier F working therein, in combination with the carriers C D E and receiver G of a grain-binder, substantially as described.

2. The weighted pendent arm I, with the segmental gear $i$ thereon, and rack $i'$, in combination with the vibrating frame H and its endless carrier F, substantially as described.

3. The hand-lever $h^3$, spring-catch $h^4$, toothed plate $h^6$, connecting-rod $h''$, and arm $h'$, in combination with the vibrating frame H and endless carrier F, as and for the purposes described.

4. In a machine for harvesting and binding grain, the carrier-frame H, with its endless carrier F, movably supported on the machine, so as to vibrate thereon, whereby the flow of the unbound grain is changed in its direction of delivery, substantially as and for the purpose described.

MARQUIS L. GORHAM.

Witnesses:
J. MASON GOSZLER,
NEWTON CRAWFORD.